F. A. WARTER.
VALVE.
APPLICATION FILED MAY 29, 1920.

1,385,058. Patented July 19, 1921.

INVENTOR
Frank A. Warter,
BY
Wm H Caufield
ATTORNEY.

UNITED STATES PATENT OFFICE.

FRANK A. WARTER, OF PERTH AMBOY, NEW JERSEY.

VALVE.

1,385,058. Specification of Letters Patent. Patented July 19, 1921.

Application filed May 29, 1920. Serial No. 385,160.

*To all whom it may concern:*

Be it known that I, FRANK A. WARTER, a citizen of the United States, and a resident of Perth Amboy, county of Middlesex, and State of New Jersey, have invented certain new and useful Improvements in Valves, of which the following is a specification.

This invention relates to an improved valve which can be used as a stop valve and can also be adjusted for use as a safety or relief valve, the adjustment being quickly and easily accomplished.

The valve can be used in many industries, but is illustrated and described as a valve used in acid and other industries, and is one in which a stuffing box or other leak-preventive structures around the stem is dispensed with, as the closure of the valve seat is accomplished by means of a diaphragm.

The invention is further designed to provide a valve in which the diaphragm can be moved positively to open or closed positions by a hand wheel or its equivalent, or it can be adjusted so as to have a limited movement relative to its manually operated actuating mechanism, so that it can be used as a float valve, a reducing valve or a relief valve.

Figure 1:
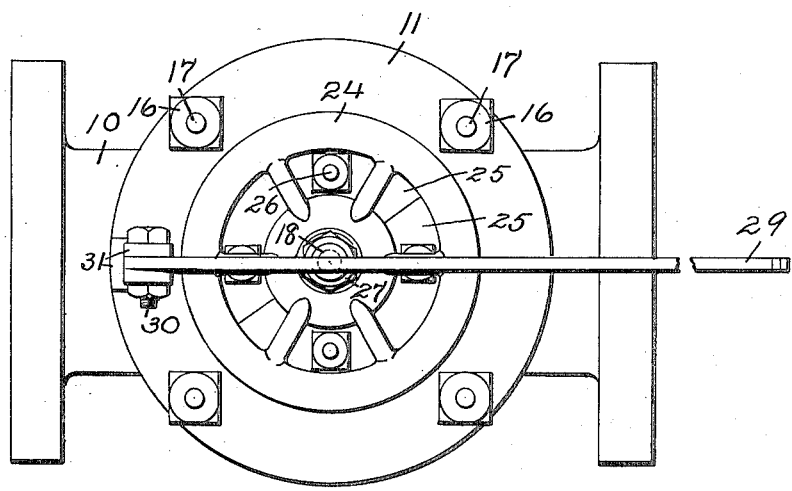
Figure 2:
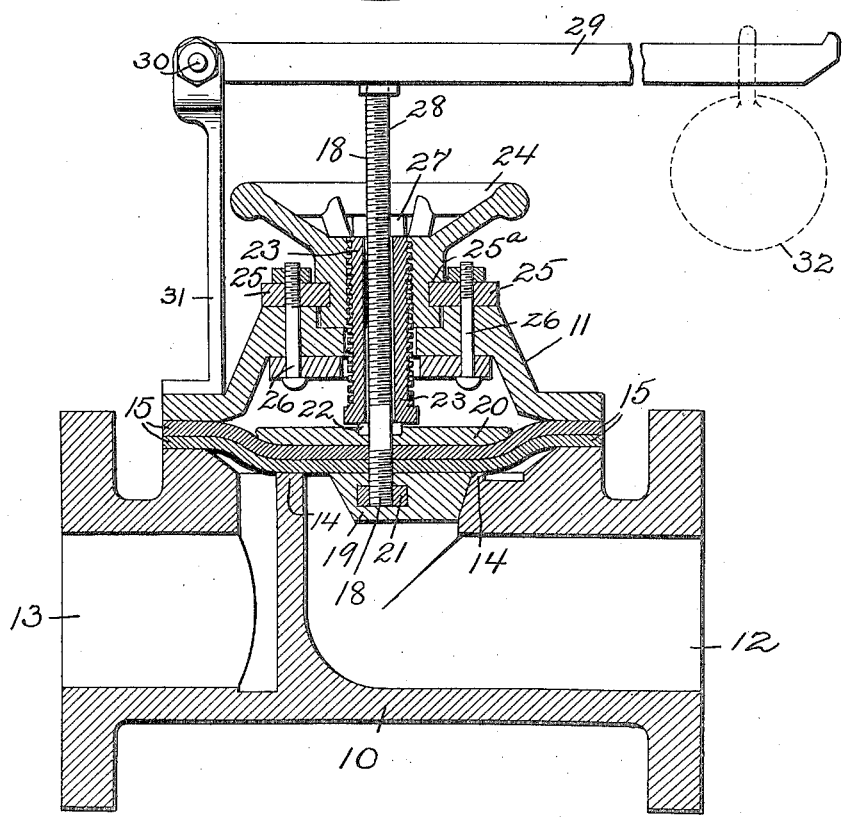

The invention is illustrated in the accompanying drawing, in which Figure 1 is a top view of a valve made according to my invention, and Fig. 2 is a central longitudinal section of the valve shown in Fig. 1.

The valve casing comprises a body portion 10 and a bonnet 11, the body portion having the inlet and outlet ports 12 and 13, respectively, the body portion having a valve seat 14 between the ports, the seat being usually round and slightly below the top part of the body portion. The diaphragm 15, preferably made of one or more sheets of rubber, is secured between the body portion and the bonnet and is held in place when the nuts 16 on the bolts 17 are screwed down.

A stem 18 is secured so that it moves with the diaphragm, this securing means being usually in the form of a follower 19 on the under side of the diaphragm and a disk 20 on the top of the diaphragm. The follower is shown as cast around the nut 21, which is screwed on the end of the stem to force the diaphragm, follower and disk 20 close together. The follower and disk are rigid, the disk being usually seated against an enlargement 22 on the stem. The stem fits loosely in a sleeve 23 and can be tightly secured against longitudinal movement relative thereto, or it can have a limited movement, one means for accomplishing this being described following.

The hand wheel 24 is adapted to be manually operated and is held against longitudinal movement by means such as a clamp 25, which is preferably split so as to enable it to be placed in position, and is held by the bolts 26, the clamp being seated in an annular groove 25ª in the hand wheel. The bore of the hand wheel and the outer circumference of the stem 23 are screw-threaded, so that when the hand wheel is turned the stem is moved longitudinally.

A lock nut 27 is placed on the screw-threaded part 28 of the stem 18 and can be screwed down to rest on the bore of the stem. The outer end of the stem can be connected to any desired actuating mechanism, in the form shown a lever 29 resting on the top of the stem and being pivoted at one end, as at 30, to a bar 31, which is secured to the valve casing. The lever, in turn, can be actuated by any preferred means, the drawing showing a conventional weight 32, although it will be understood that floats or other similar actuating means can be connected to the lever 29.

In the drawing I have illustrated a valve adjusted for use as a stop valve, the lock nut 27 being screwed down so that the stem is tightly held between the lock nut 27 and the disk 20. As the hand wheel is turned, the sleeve is raised or lowered, and this, of course, carries with it the stem, so that the diaphragm is positively raised and lowered with the stem and the valve can be opened and closed by manipulating the hand wheel 24.

It will be readily seen that if the lock nut 27 is turned so that it retreats from the sleeve 23, there is a possible movement of the stem 18 relative to the sleeve. Then if the sleeve is raised by turning the hand wheel, the diaphragm is free to be moved up and down and the valve is thus adapted for use as a relief valve or as a float valve, depending on whether a pressure of liquid entering the valve forces the diaphragm toward an open position, or whether the diaphragm is actuated through the stem. If desired, a predetermined minimum flow can be established by placing the lock nut 27 so that the diaphragm is partly opened.

Changes can be made in the details of the invention, and the parts can have a slight modification of arrangement or form, without departing from the scope of the invention.

I claim:

1. A valve comprising a casing having inlet and outlet ports with a valve seat between them, a diaphragm disposed so as to be forced on the seat to close it, a stem secured to the diaphragm, and a sleeve movable longitudinally in the casing and adapted to lock the diaphragm in closed position, the stem being slidable in the sleeve.

2. A valve comprising a casing having inlet and outlet ports with a valve seat between them, a diaphragm disposed so as to be forced on the seat to close it, a stem secured to the diaphragm, a sleeve movable longitudinally in the casing and adapted to lock the diaphragm in closed position, the stem being slidable in the sleeve, and means for limiting the sliding of the stem in the sleeve.

3. A valve comprising a casing having inlet and outlet ports with a valve seat between them, a diaphragm adapted to close the valve seat, a stem connected to the diaphragm, a sleeve through which the stem freely slides, means for moving the sleeve longitudinally, and a nut on the stem and adapted to bear on the top of the sleeve.

4. A valve comprising a casing having inlet and outlet ports with a valve seat between them, a diaphragm adapted to close the port through the valve seat, a stem connected to the diaphragm, a sleeve through which the stem freely slides, a hand wheel, screw-threaded connections by means of which turning of the hand wheel moves the sleeve longitudinally, and adjustable means on the stem for limiting the inward movement of the stem relative to the sleeve.

5. A valve comprising a casing having inlet and outlet ports with a valve seat between them, a flexible diaphragm secured to the casing and adapted to rest on the valve seat, a rigid follower under the diaphragm, a rigid disk on the diaphragm, a stem secured to the follower and the disk and projecting outward therefrom, a hand wheel secured to the casing against movement other than rotary, and a screw-threaded connection whereby rotation of the hand wheel moves the stem longitudinally.

6. A valve comprising a casing having inlet and outlet ports with a valve seat between them, a flexible diaphragm secured to the casing and adapted to rest on the valve seat, a rigid follower under the diaphragm, a rigid disk on the diaphragm, a stem secured to the follower and the disk and projecting outward therefrom, a hand wheel secured to the casing against movement other than rotary, a sleeve in which the stem freely slides, the wheel and stem being screw-threaded, the outward movement of the disk being limited by the sleeve, and a nut on the stem for adjustably limiting the inward movement of the stem in the sleeve.

7. A valve comprising a casing having inlet and outlet ports with a valve seat between them, a flexible diaphragm secured to the casing and adapted to rest on the valve seat, a rigid follower under the diaphragm, a rigid disk on the diaphragm, a stem secured to the follower and the disk and projecting outward therefrom, a hand wheel secured to the casing against movement other than rotary, a sleeve in which the stem freely slides, the wheel and stem being screw-threaded, the outward movement of the disk being limited by the inner end of the sleeve, a nut on the stem for adjustably limiting the inward movement of the stem in the sleeve, and a pivoted lever resting on the stem.

In testimony that I claim the foregoing, I have hereto set my hand, this 28th day of May, 1920.

FRANK A. WARTER.